United States Patent
Sridhar et al.

(10) Patent No.: US 11,902,114 B2
(45) Date of Patent: *Feb. 13, 2024

(54) SYSTEM AND METHOD FOR PREDICTING AND REDUCING SUBSCRIBER CHURN

(71) Applicant: Sandvine Corporation, Waterloo (CA)

(72) Inventors: Kamakshi Sridhar, Fremont, CA (US); Lars Anton Gunnarsson, Bangkok (TH); Alexander Havang, Malmo (SE); Pavle Mihajlovic, Waterloo (CA); Kavi Kanasupramaniam, Waterloo (CA)

(*) Notice: Subject to any disclaimer, the term of this patent is extended or adjusted under 35 U.S.C. 154(b) by 0 days.

This patent is subject to a terminal disclaimer.

(21) Appl. No.: 17/545,162

(22) Filed: Dec. 8, 2021

(65) Prior Publication Data

US 2022/0131770 A1   Apr. 28, 2022

Related U.S. Application Data

(63) Continuation of application No. 16/598,112, filed on Oct. 10, 2019, now Pat. No. 11,240,125.

(Continued)

(51) Int. Cl.
*H04L 41/5067* (2022.01)
*H04L 41/147* (2022.01)
(Continued)

(52) U.S. Cl.
CPC ........ *H04L 41/5067* (2013.01); *H04L 41/147* (2013.01); *H04L 41/5064* (2013.01); *H04L 67/535* (2022.05)

(58) Field of Classification Search
CPC .............. H04L 41/147; H04L 41/5064; H04L 41/5067; H04L 67/535
See application file for complete search history.

(56) References Cited

U.S. PATENT DOCUMENTS 10,580,020 B2   3/2020   Sharma et al.
10,748,166 B2 * 8/2020   Dong ............... G06F 16/285
(Continued)

FOREIGN PATENT DOCUMENTS

WO   2010082885 A1   7/2010

OTHER PUBLICATIONS

European Patent Office, Examiner's Report for corresponding EP App. No. 19202494.1, dated Nov. 17, 2021.

(Continued)

*Primary Examiner* — Mohamed A. Wasel
(74) *Attorney, Agent, or Firm* — Amarok IP Inc.; Neil W. Henderson

(57) ABSTRACT

A system and method for creating a model for predicting and reducing subscriber churn in a computer network. The method including: for a predetermined time period: retrieving traffic flow data per subscriber for a plurality of subscribers in the computer network; determining at least one metric per subscriber from the traffic flow data; determining at least one systemic feature associated with the plurality of subscribers; and storing the at least one amalgamated metric and feature; on reaching the predetermined time period create the model by: analyzing at least one metric and at least one feature for the predetermined time period; predicting, per subscriber, whether the subscriber is going to churn within a churn period in the future based on the analysis; validating the prediction by determining whether the subscriber actually churned during the churn period; and creating the model based on the validated predictions.

20 Claims, 13 Drawing Sheets

Related U.S. Application Data

(60) Provisional application No. 62/743,844, filed on Oct. 10, 2018.

(51) Int. Cl.
   H04L 41/5061 (2022.01)
   H04L 67/50 (2022.01)

(56) References Cited

U.S. PATENT DOCUMENTS

| | | | |
|---|---|---|---|
| 11,240,125 B2* | 2/2022 | Sridhar | H04L 41/5064 |
| 2007/0156673 A1* | 7/2007 | Maga | G06Q 30/02 |
| | | | 707/999.005 |
| 2007/0185867 A1* | 8/2007 | Maga | G06Q 30/02 |
| 2013/0054306 A1* | 2/2013 | Bhalla | G06Q 30/0201 |
| | | | 705/7.31 |
| 2013/0185245 A1* | 7/2013 | Anderson | G06Q 50/00 |
| | | | 706/52 |
| 2013/0279672 A1* | 10/2013 | Mohan | H04M 15/47 |
| | | | 379/133 |
| 2014/0119522 A1* | 5/2014 | Phadke | H04M 15/44 |
| | | | 379/133 |
| 2015/0039540 A1* | 2/2015 | Dong | G06N 20/00 |
| | | | 706/12 |
| 2015/0371163 A1 | 12/2015 | Noh et al. | |
| 2016/0253688 A1* | 9/2016 | Nielsen | G06Q 50/01 |
| | | | 705/7.31 |
| 2016/0314484 A1* | 10/2016 | Dong | G06F 16/2465 |
| 2017/0169458 A1* | 6/2017 | Singh | G06Q 30/0234 |
| 2017/0262275 A1* | 9/2017 | Mohiuddin | G06N 20/00 |
| 2017/0364933 A1* | 12/2017 | Chen | G06Q 10/067 |
| 2018/0018684 A1* | 1/2018 | Orr | G06Q 30/0202 |
| 2018/0181561 A1* | 6/2018 | Raanani | G10L 15/1822 |
| 2018/0253637 A1* | 9/2018 | Zhu | H04L 67/535 |
| 2018/0268318 A1* | 9/2018 | Matam | G06N 7/01 |
| 2019/0116504 A1* | 4/2019 | Rusackas | H04L 41/22 |
| 2019/0163666 A1* | 5/2019 | Cakmak | G06N 5/02 |

OTHER PUBLICATIONS

European Patent Office, Extended European Search Report for 19202494.1, dated Jun. 12, 2019.

* cited by examiner

| Sub Name | Actual Churn Day | Prediction Day | Data Window | Churn Label |
|---|---|---|---|---|
| John | Jan 15th | Dec 24th | Nov 23rd – Dec 23rd | 1 |
| Jim | Jan 20th | Dec 24th | Nov 23rd – Dec 23rd | 1 |
| Jack | Jan 7th | Dec 24th | Nov 23rd – Dec 23rd | 1 |
| Max | Not a churner | Dec 24th | Nov 23rd – Dec 23rd | 0 |
| May | Feb 12th | Dec 24th | Nov 23rd – Dec 23rd | 0 |
| Mike | Jan 2nd | Dec 24th | Nov 23rd – Dec 23rd | 0 |

| Sub Name | Data Window | Churn Label |
|---|---|---|
| John | Nov 23rd – Dec 23rd | 1 |
| Jim | Nov 23rd – Dec 23rd | 1 |
| Jack | Nov 23rd – Dec 23rd | 1 |
| Max | Nov 23rd – Dec 23rd | 0 |
| Mary | Nov 23rd – Dec 23rd | 0 |
| Mike | Nov 23rd – Dec 23rd | 0 |

↑ Generate Features Using Data Window ↑

| Sub Name | X1 - Xn | Churn Label |
|---|---|---|
| John | | 1 |
| Jim | | 1 |
| Jack | | 1 |
| Max | | 0 |
| Mary | | 0 |
| Mike | | 0 |

SYSTEM AND METHOD FOR PREDICTING AND REDUCING SUBSCRIBER CHURN

RELATED APPLICATIONS

This application is a continuation of Applicant Ser. No. 16/598,112, filed Oct. 10, 2019, which claims priority to U.S. Provisional Application No. 62/743,844, filed Oct. 10, 2018, both of which are hereby incorporated herein by reference.

FIELD

The present disclosure relates generally to computer network traffic. More particularly, the present disclosure relates to a system and method for predicting and reducing subscriber churn in a computer network.

BACKGROUND

Computer networks continue to expand and competition is becoming increasingly available to subscribers. Further, user expectations for Quality of Experience (QoE) continues to increase all over the world. Users today often have a plurality of options in their choice of a service provider. Users expect a high and a consistent QoE, high network reliability and low cost service plans from their network service provider. Whenever a user or subscriber leaves a service provider, it is referred to as churn. Service providers do their best to keep existing users within their network, because it tends to be costly to attract new subscribers.

Users churn out of the network due to various reasons. Users may churn due to poor network Quality of Experience issues or due to other issues such as change in subscriber plans or new service offering by competitors or due to the user moving out of the region to a new location or the like. The reasons that a user churns may vary depending on the network technology, geographic region, time of the year or other factors.

Mitigating user churn is often a key objective for service providers. It is, therefore, desirable to provide an improved method and system for reducing churn on a computer network.

The above information is presented as background information only to assist with an understanding of the present disclosure. No determination has been made, and no assertion is made, as to whether any of the above might be applicable as prior art with regard to the present disclosure.

SUMMARY

In a first aspect, there is provided method for creating a model for predicting and reducing subscriber churn in a computer network, the method including: for a predetermined time period: retrieving traffic flow data per subscriber for a plurality of subscribers in the computer network; determining at least one metric per subscriber from the traffic flow data; determining at least one systemic feature associated with the plurality of subscribers; and storing the at least one amalgamated metric and feature; on reaching the predetermined time period create the model by: analyzing at least one metric and at least one feature for the predetermined time period; predicting, per subscriber, whether the subscriber is going to churn within a churn period in the future based on the analysis; validating the prediction by determining whether the subscriber actually churned during the churn period; and creating the model based on the validated predictions.

In some cases, determining the at least one subscriber may include: determining if there are any missing data points for the at least one subscriber metric; if there are any missing data points, determining whether a known value may be used in place of any of the missing data points and amalgamating the known value with the at least one subscriber metric; otherwise determining whether there are sufficient data points for the at least one subscriber metric to make a prediction regarding subscriber churn.

In some cases, determining the at least one subscriber metric may include: determining whether the at least one subscriber metric includes too many data points; grouping the data points based on the time the data point was retrieved; taking a mean of the grouped data points; and using the mean of the grouped data points as the at least one subscriber metric or the at least one systemic feature.

In some cases, validating the prediction may include: determining the accuracy of the prediction per subscriber; comparing a percent of all subscribers predicted to churn by the model to a percent of the subscribers that actually churn and if the accuracy and the comparison are above a predetermined threshold; determine that the model is valid, otherwise continue to prepare and develop the model.

In some cases, the predetermined time period is sufficient in length to provide a sufficient data points for the prediction per subscriber.

In some cases, the churn period may include: a churn time period being a time period in the future, beyond when the prediction was made, which the model is making the prediction of whether the subscriber will churn.

In some cases, the at least one metric per subscriber may be selected based on the churn time period for the model.

In some cases, the at least one systemic feature is selected from the group including: subscriber attributes; device attributes, subscriber service plan; location information; geographic information; and network information.

In some cases, the validating the prediction may include validating the prediction using N-fold cross validation.

In some cases, analyzing of the at least one metric and at least one feature may use a model selected from the group comprising: Gaussian model, Light Gradient Boost Model, Stochastic Vector Machines, Gaussian Naïve Bayes, Logistic Regressions, Neural Network Deep Neural Networks and Recurrent Neural Networks.

In another aspect, there is provided a method for predicting and reducing subscriber churn on a computer network, the method including: retrieving traffic flow data for a subscriber of the computer network; determining at least one subscriber metric from the traffic flow data; analyzing the at least one subscriber metric with a model for predicting subscriber churn; predicting whether the subscriber will churn during a predetermined churn period; and if the subscriber is predicted to churn, providing a traffic action on the traffic flow for the subscriber; otherwise allowing the subscriber's traffic flow to continue without action.

In some cases, the churn period may include: a churn time period being a time period in the future, past when the prediction was made, which the model is making the prediction of whether the subscriber will churn.

In some cases, the traffic action may be selected from a group including: shaping the traffic; providing the subscriber more bandwidth; reporting the subscriber to a service provider; and flagging the subscriber's traffic for further review.

In yet another aspect, there is provided a system for predicting and reducing subscriber churn on a computer network, the system including: a data collection module configured to: retrieve traffic flow data per subscriber for a plurality of subscribers in the computer network; and determine at least one systemic feature associated with the plurality of subscribers; a feature extraction module configured to determine at least one metric per subscriber form the traffic flow data; a machine learning module configured to: analyze at least one metric and at least one feature for the predetermined time period; create a model for predicting and reducing subscriber churn based on the analysis; and predict per subscriber, whether the subscriber is going to churn within a churn period in the future based on the analysis; an evaluation module configured to validate the prediction by determining whether the subscriber actually churned during the churn period; and a reporting module configured to perform a traffic action based on the prediction.

In some cases, the data collection module may be further configured to: determine if there are any missing data points for the at least one subscriber metric; if there are any missing data points, determine whether a known value may be used in place of any of the missing data points and amalgamate the known value with the at least one subscriber metric; otherwise determine whether there are sufficient data points for the at least one subscriber metric to make a prediction regarding subscriber churn.

In some cases, the data collection module may be further configured to: determine whether the at least one subscriber metric includes too many data points; group the data points based on the time the data point was retrieved; take a mean of the grouped data points; and use the mean of the grouped data points as the at least one subscriber metric or the at least one systemic feature.

In some cases, the evaluation module may be further configured to: determine the accuracy of the prediction per subscriber; compare a percent of all subscribers predicted to churn by the model to a percent of the subscribers that actually churn; and if the accuracy and the comparison are above a predetermined threshold; determine that the model is valid, otherwise continue to prepare and develop the model.

In some cases, the traffic action may be selected from a group comprising: shaping the traffic; providing the subscriber more bandwidth; reporting the subscriber to a service provider; and flagging the subscriber's traffic for further review.

In some cases, the at least one systemic feature may be selected from the group comprising: subscriber attributes; device attributes, subscriber service plan; location information; geographic information; and network information.

In some cases, the predetermined time period is sufficient in length to provide a sufficient data points for the prediction per subscriber.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

FIG. 9 illustrates data inputs to a system for predicting and reducing subscriber churn for dates in the data window;

FIG. 10 illustrates an example data setup for 3-fold cross validation;

DETAILED DESCRIPTION

Generally, the present disclosure provides embodiments of a method and system for reducing churn on a computer network. The system and method are intend to retrieve data associated with a subscriber. The system reviews the data to determine which subscribers are more likely to churn. In some cases, the system and method may provide for mitigating traffic actions to reduce the likelihood of a subscriber churning.

It is important to predict churn before subscribers or users actually churns. Predicting that a user will churn just before they actually churn is not very useful because there is limited possibility for the service operator to convince the user to stay on the network. It is intended to be more useful to get reliable indications that a subscriber is going to churn much before the user actually churns. That will give the service provider or operator some time to provide incentives and/or address root causes that are leading the subscriber to churn.

Predicting user churn with very high degree of accuracy as the user actually churns has limited value because remedial actions taken to prevent the user from churning will not have much time to take effect, and therefore will be limited in value. Instead, the system and method presented herein are intended to be able to predict subscriber churn in advance and with sufficient time to allow remedial action to occur, which is intended to reduce user churn.

Embodiments of the method to predict and reduce subscriber churn before the subscribers actually leave an Operator network and move to a competitor Operator (Service Provider) network is detailed herein. Machine Learning (ML) techniques may be applied to various data sources to identify the factors that predict churn and take mitigating actions to lower subscriber churn before the user actually churns. Through closed loop monitoring, remedial actions are identified, modified and fine-tuned by measuring the effectiveness of the actions taken with the objective of lowering user churn.

Figure 1:
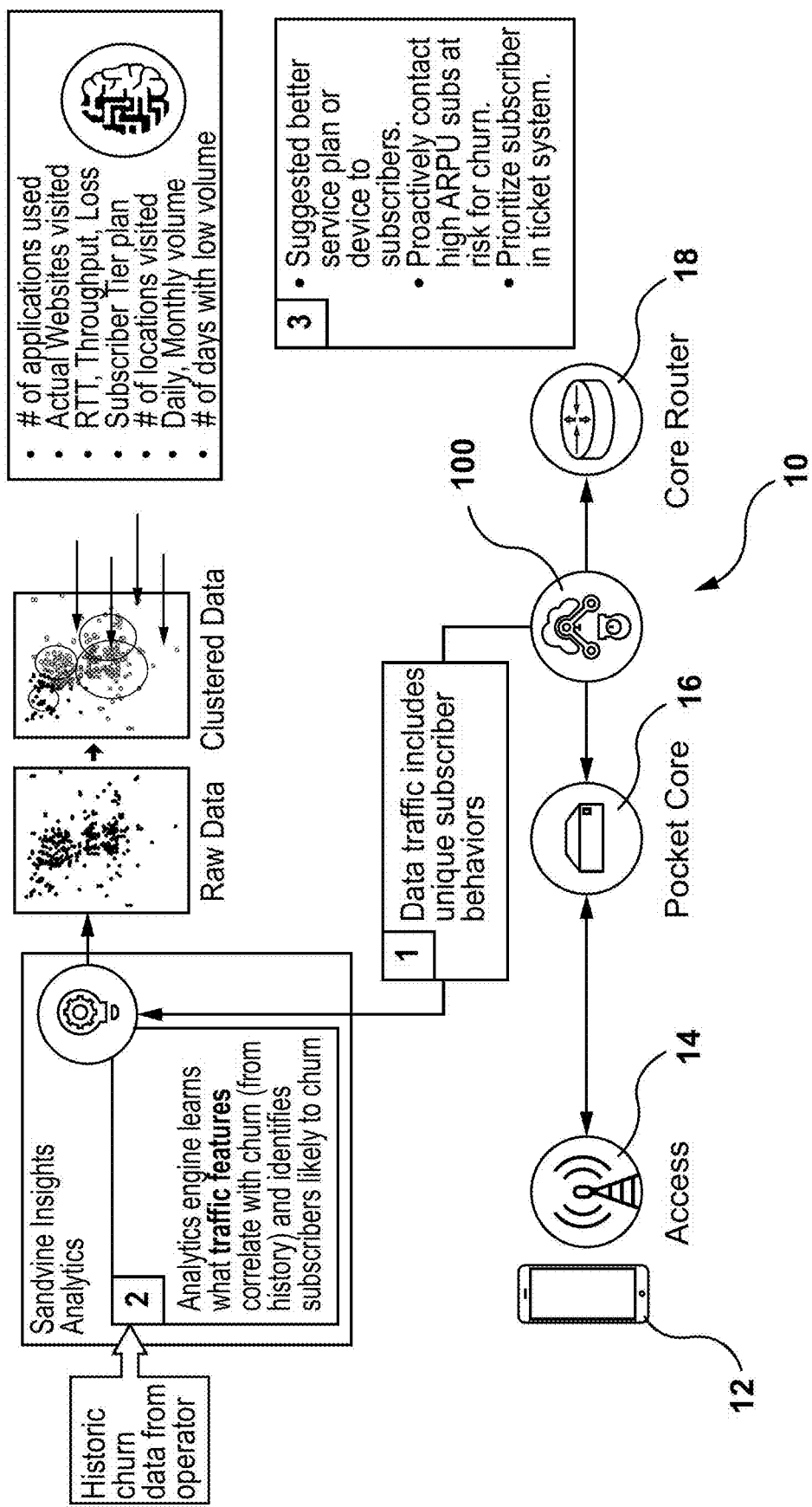
FIG. 1 is diagram illustrating an overview of an environment of a system for predicting and reducing subscriber churn.

FIG. 1 illustrates an environment 10 for use with the system 100 for predicting and reducing subscriber churn. Subscriber's 12 may access data via an access network 14. The access network may be connected to a packet core 16. The system 100 may reside between the packet core 16 and a core router 18, wherein the core router is connect to a core network (not shown). It is intended that the system is positioned in order to access data from a plurality of subscribers associated with the access network 14. In some cases, the system may be inline where the system is measuring data directly, and may be able to timestamp the data on receipt. In some other cases, the system may be offline and get data through a tap or otherwise be able to retrieve data from the traffic flow. Data obtained from the system 100 may not be in real time but is intended to be timestamped to allow the system to accurately classify and analyze the data.

The principles and techniques described herein are in the context of a mobile service provider. However, it will be understood that embodiments of the system and method are intended to be equally applicable to cable networks, satellite networks and various wireline, for example, digital subscriber line (DSL), Fiber to the home, and like networks.

Service Providers invest a large amount of capital in acquiring new users (sometimes referred to as subscribers) and offering service plans to keep these users from leaving the network. Service providers (sometimes referred to as operators or network operators) believe minimizing churn is important. It is often consider more important to a service provider when average revenue per user (ARPU) is high and cost of acquiring new subscribers is high.

When managing churn, getting good predictions early is often considered to be more important than perfect predictions later, after a user has already decided to leave. Managing predictions is a complex problem, where culture, demographics, device, quality, personality, financial situation, interests, and the like, may affect the outcome. In spite of the complexity, users who are likely to churn often have certain attributes that may be characterized effectively.

Embodiments of the system and method described herein aim to address this issues and to predict which users, if any, are likely to churn, well enough in advance, such that churn can be reduced. Churn may be prevented if mitigating action is taken to provide the user with a higher Quality of Experience when using the network. This is referred to as 'Minimizing Churn'.

Churn generally depends on various combination of multiple factors. These combinations are not considered to be easily identifiable based on traditional techniques. Conventionally, there has been no known literature on standards or techniques that predict user churn, with any accuracy, much before the user actually churns. As a result, while the existing techniques may predict churn these techniques often do so when it is too late to make a difference.

Embodiments of the system and method for predicting and reducing subscriber churn provides for a solution that identifies subscribers who have a high probability of churning in the foreseeable future, but before the subscriber actually churns. Embodiments of the system and method may identify the reasons that these subscribers want to churn. The system collects network data which includes traffic flow metrics such as throughput, loss and latency, as well as systemic features for example subscriber attributes such as device used, applications used, how long the subscriber has been a customer, and the like as well as network information, geographic information and the like. This information is collected into a database or other memory component over a predetermined period of time, for example, several days, weeks, months or the like. In addition, churn labels that indicate when the subscriber churned is also included and stored where it is available. The data and the labels are used as inputs to a machine learning method to train models that are intended to be able to classify and map which subscribers churned and the data features that contributed to the churn. It is intended that the traffic flow metrics, systemic features and churn labels may be categorized and organized into a churn time prior. The models aim to learn the behavior based on prior data to make future inferences, within the churn time period. After the models are trained and validated, then the models can be used to predict if a new incoming or current subscriber will churn and when such a churn is likely to happen. Then the system, via network changes, and/or the network operator can use the predictions made by the models to help address the reasons that are causing the users to churn.

The data available for analysis may contain thousands of metrics or features that may be accessible from monitoring and reviewing subscriber behavior and associated analytics. One or more combinations of features can result in subscriber churn. These features and metrics that may be included are obvious and not obvious aspects of the user's experience. Example features that may aid in predicting user churn include:
  number of visits to competitor websites;
  number of years before a user could change device (for example: after 2 years, or the like);
  type of contract—prepaid or postpaid;
  poor user QoE, which may be measured by RTT, Throughput, Loss;
  quality metrics;
  how often a user is hitting the caps on the data plans;
  number of times the user roams through 3G networks;
  and the like It will be understood that this list is not exhaustive and may vary from one Service Provider to another. For the rest of this disclosure, the following notation is used: A Vector X is defined as $X=\{X1, X2, X3, \ldots Xn\}$ where $Xi$=feature or metric that could lead to churn.

In a specific simplified example, $X1$=# of visits to competitor websites; and $X2$=days spent with bad QoE. It will be understood that further features and metrics or different features could be used.

The system is intended to have access to labeled data, for example, data related to at least one metric and historic data related to user churn. Data related to the churn may be service provider or network operator specific. For example, a churn report may indicate the name of the subscriber, the date when the subscriber churned and the possible reason they churned. A churn report from a different operator may indicate the name of the subscriber, the date when the user churned and the duration for which they have been a customer with the operator. Each operator may consider different features to be more or less important to their subscriber churn. In reality, the data set may contain thousands or millions of metrics or features, for example:
  Applications/Websites used, when, where, on what device, with what quality;
  Places visited, when, how often;
  Devices used, switch of devices;
  Plans used, how much;
  Days with high volume, days with low;
  Night time use, day time use;
  Time on 3G, time on 4G, time on WiFi;
  Age of User, billing status, billing history;
  Etc.

Figure 2:
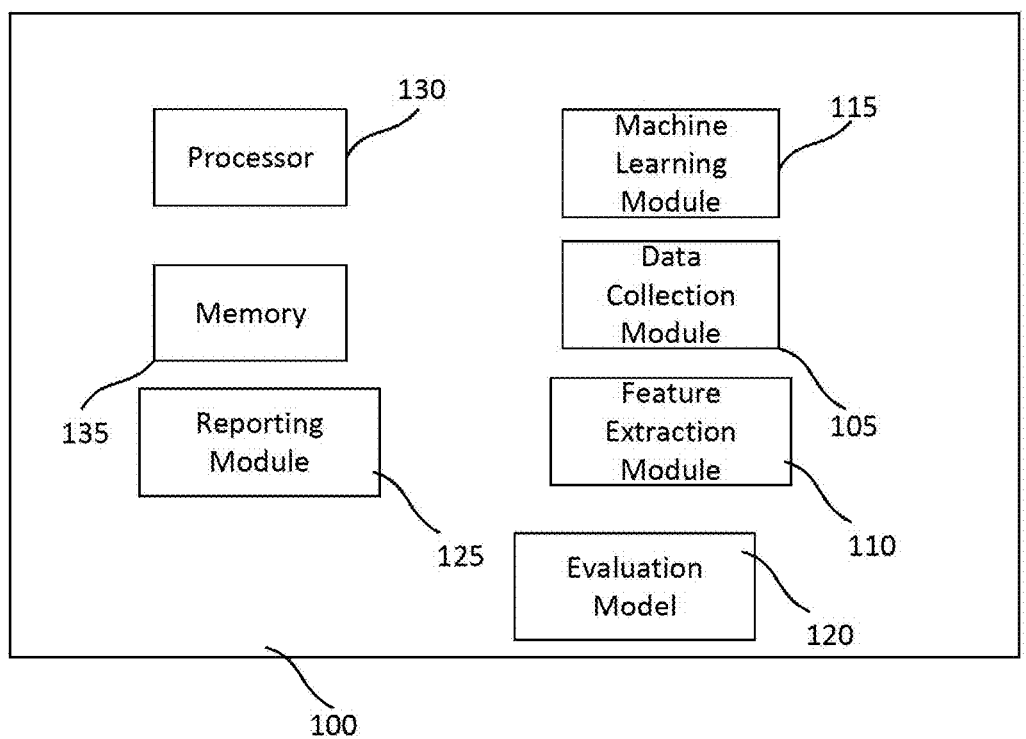
FIG. 2 illustrates a system for predicting and reducing subscriber churn.

FIG. 2 illustrates a system 100 for predicting and reducing subscriber churn. The system includes a data collection module 105, a feature extraction module 110, a machine learning module 115, an evaluation module 120, a reporting module 125 and at least one processor 130 and at least one memory 135 component. The system is intended to reside on the core network, and have access to the traffic flow data. As noted above, the system may be offline and may retrieve or may be fed timestamped data associated with the traffic flow per subscriber on the network. The modules, including the processor 130 and memory 135, are in communication with each other but may be distributed over various network devices or may be housed within a single network device. The system 100 is intended to receive information from the computer network equipment that allows the system to determine traffic flow and performance statistics and subscriber data as well as determining systemic features.

The data collection module 105 is configured to determine data associated with the subscriber and the traffic flow. The data collection module 105 may be further configured to determine missing data and may be further configured to condense data sets as detailed herein. The data collection module 105 is intended to determine the appropriate data to be used to in training the machine learning module and determining whether any subscribers are likely to churn.

The feature extraction module 110 is configured to determining the features to be used in the machine learning model for the prediction of subscriber churn.

The machine learning module 115 is configured to train a machine learning model and store machine learning model once the model has been trained. The evaluation module 120 is configured to evaluate the machine learning model to determine the accuracy of machine learning model. The reporting model 125 is configured to reviewing the predicted churn subscribers from the machine learning model 115 and report the potential subscriber churners to the service provider. In some cases, the reporting model may perform traffic actions, for example, shaping, QoE actions, providing further bandwidth to a subscriber, adjusting the quality of video streaming flows, or the like to improve the subscriber's experience to reduce the chance the subscriber will churn.

Figure 3:
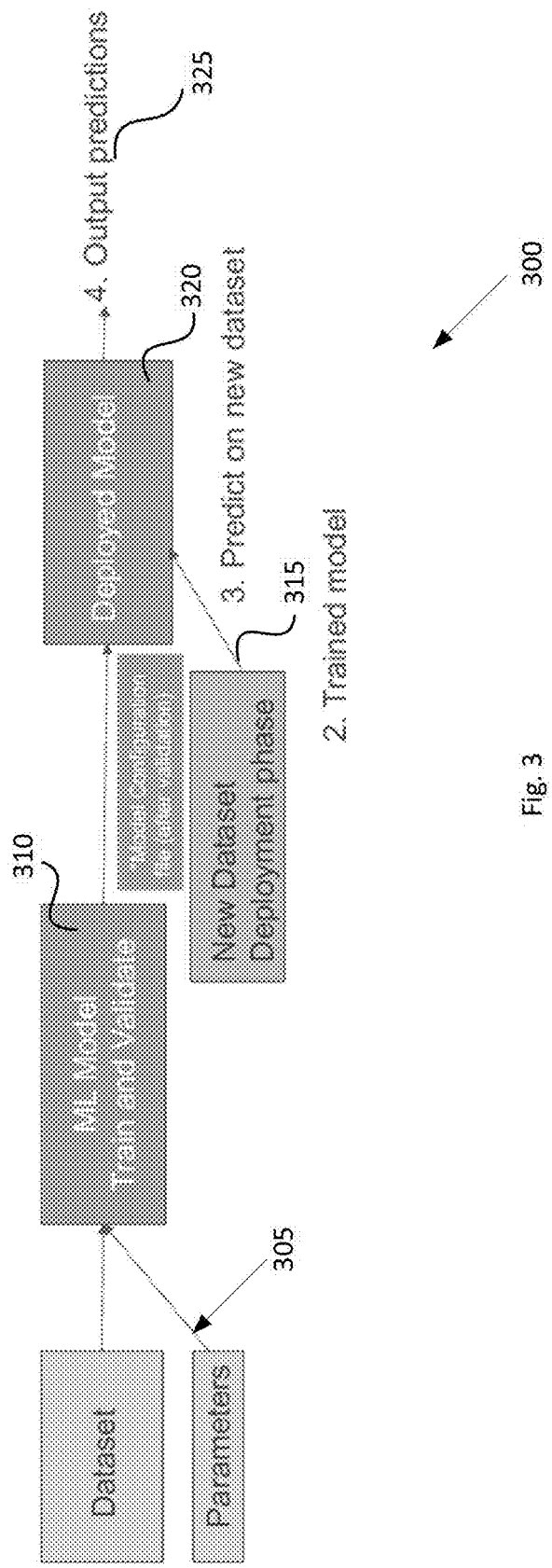
FIG. 3 is a flow chart illustrating an embodiment of a method for predicting and reducing subscriber churn.

FIG. 3 is a flowchart illustrating a method 300 to predict and reduce subscriber churn according to an embodiment. The method includes a training, validation and deployment methods as described herein.

At 305 at least one dataset and parameters are fed to the machine learning model 115. The dataset and parameters may have been previously stored in the memory component 135. At 310, the machine learning module 115 trains and the evaluation module 120 validates the machine learning model. A trained model is able to predict which users (sometimes referred to as subscribers) will churn and when, in the future, they will be likely churn.

At 315, after training, a new data set is retrieved by the system. At 320, the system analyzes the data of new dataset against the previously trained model. At 325, the system determines predictions based on the new dataset. In some cases, the reporting module 120 may further determine the cause of the potential churn and perform or have a network device perform traffic actions that may be used to reduce subscriber churn.

Figure 4:
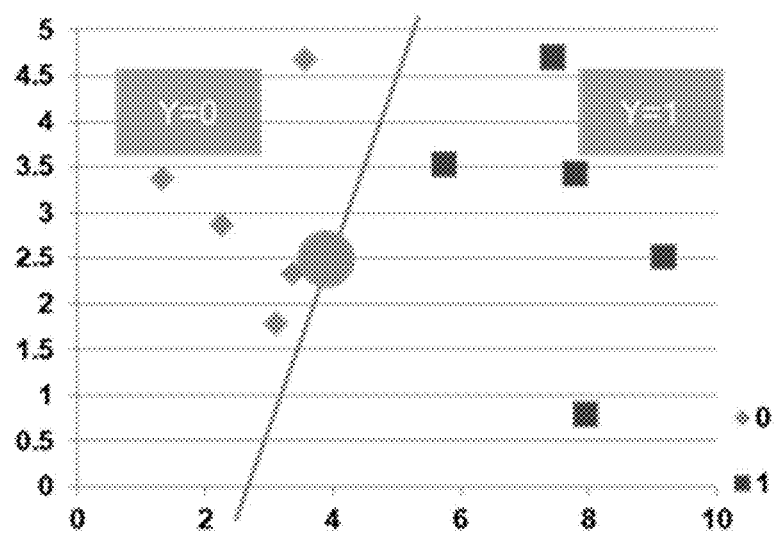
FIG. 4 is a graph illustrating users who will likely churn and those who will not likely churn.

In some cases, the method to predict and reduce subscriber churn may be performed at predetermined intervals, for example, once an hour, once every 12 hours, once a day, once every 2 days or the like. It is intended that, based on the way the user churn labels are organized in relation to the dataset to allow for the prediction of user churn to be made several days into the future. It is intended that the method may be predict subscriber churn for a churn period or a span of days in the future, for example, a week, 10 days, two weeks, one month or the like. FIG. 4 is a graph illustrating which subscribers are likely to churn, those where the model predicts Y=1, compared to Y=0 where the subscribers are unlikely to churn.

Figure 5:
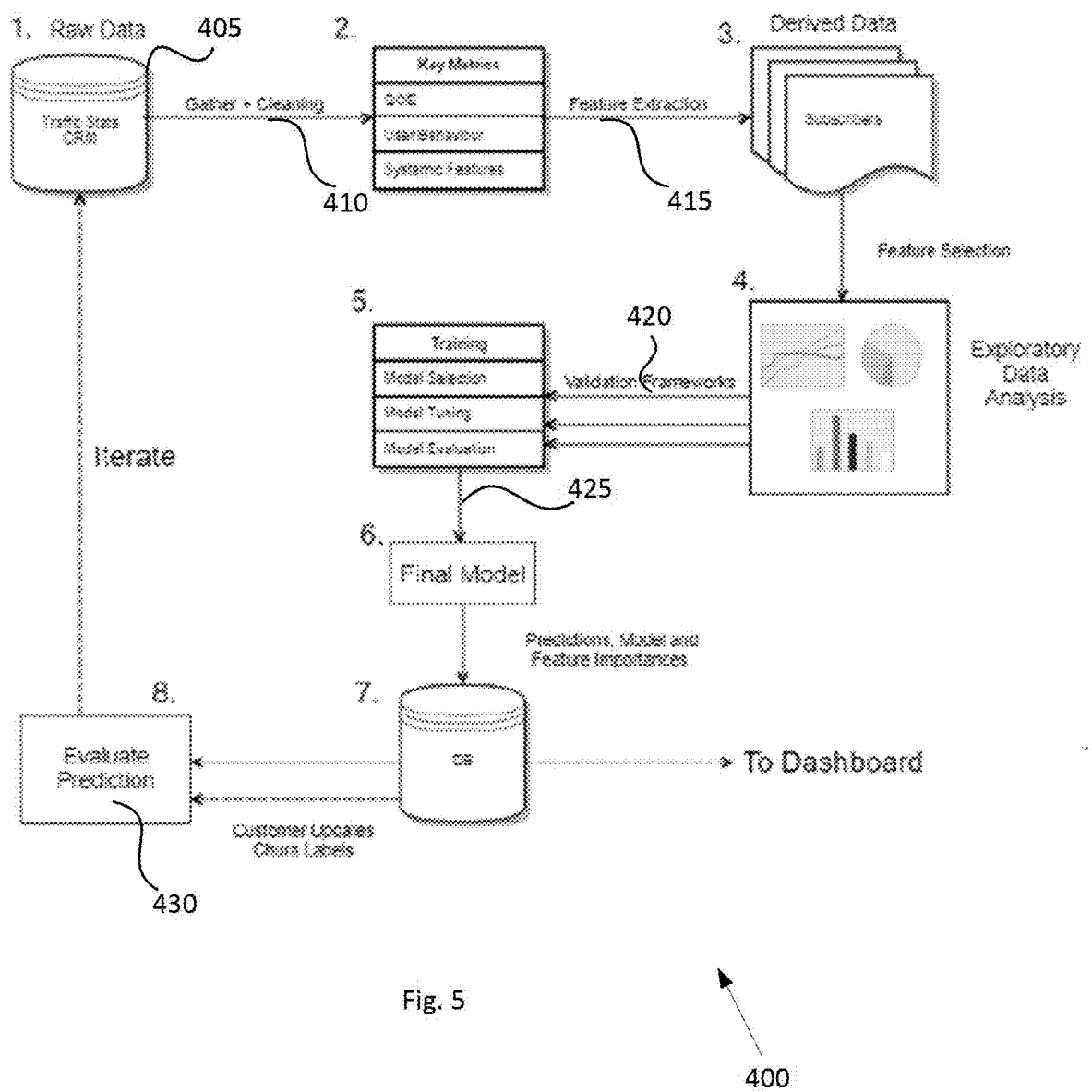
FIG. 5 illustrates a method for model training and validation according to an embodiment.

FIG. 5 illustrates a method 400 for data preparation according to an embodiment. In particular, it will be understood that raw data without context is often considered to be meaningless, in that without context the data is unable to be used in predictions. It is intended that the data preparation process identifies patterns and intricacies in the data which may not be visible in a raw form. Raw data may be fetched or received by the data collection module 105 and may then be transformed by the system in order to provide results with respect to suspected subscriber churn.

At 405, raw data may be retrieved or determined from the traffic flow and from systemic features, which may include associated subscriber information. Data may be retrieved or received at predetermined intervals, via the data collection module 105, for example every 5 minutes, every 15 minutes, every 30 minutes or the like. In some cases, the amount of data received may be too large and the data may be condensed into smaller tables.

Metrics such as. QoE metrics, user behaviors and systemic features may be collected by the data collection module. In a particular example, QOE measurements like round trip time (RTT) may be received every 5 minutes. The system may be configured to derive a daily RTT value by taking the mean of all the RTT samples for that day. By condensing the data points, it is intended that the amount of data is reasonable to review but still provides for an adequate representation of the measurement in question.

On the other hand, there may be some data points that are sparse enough that they are not required to be condensed or it may not be desirable to condense the data points. In one particular example, competitor site visits by a subscriber may not be condensed.

Figure 6:
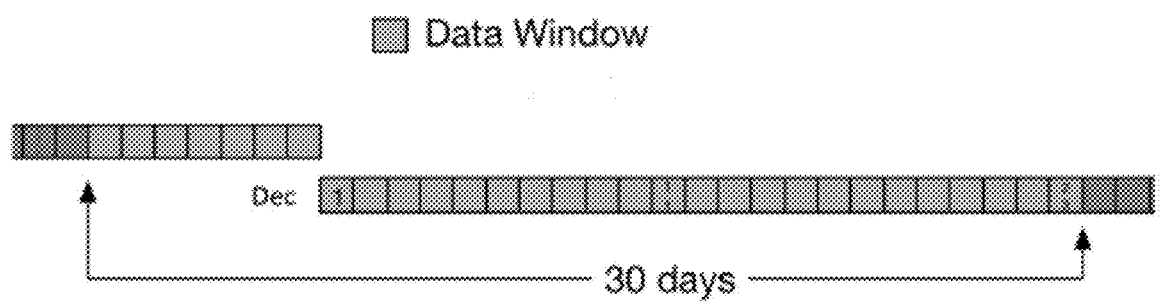
FIG. 6 illustrate an example of a data window according to an embodiment.

Based on the size of the data a derived set of traffic statistics is created, where the data is condensed into a smaller form. The system may condense the data to ensure that that it is still in an interpretable form. In some cases, roll up may be done on the database frequently, for example once a day, twice a day or the like. It will be understood that new data is added on a continuing basis, for example, once a day, which can be aggregated or otherwise amalgamated with the older data. In some cases, old data that is too far in the past may be dropped via, for example, a moving window, for example as shown in FIG. 6. In some cases, old data may be data gathered over for example, 30 days ago, 60 days ago, 90 days ago or the like.

The collected data may also be cleaned, at 410. For the data to be cleaned, the data may be reviewed by the data collection module to determine whether there are any missing values. The system may review the values on a per subscriber and a per column basis to determine whether there are any missing values, as detailed herein.

The system may then determine whether a subscriber has enough data points to be a candidate for further review. This review may be needed to be able to explain why a user churns. Identifying churning subscribers, when a subscriber has a number of missing data points may not provide adequate explanations for an operator to identify remedies to reduce the likelihood of the subscriber churning.

The system may also determine whether any data stored in tables is missing are missing data points in any column.

For example, if the timestamp column or subscriber identification column has a missing value, the data associated with that row may not be properly analyzed by the system. The system may be configured to extract patterns that appear to apply to most subscribers. If a column is too sparse, the column may be discarded or disregard from the calculations on the data.

In some cases, the system may further provide for the imputation of missing values. Machine Learning may be aided by interpolating and/or filling missing values. The system may also be able to determine whether there are outliers within the data set and remove the outliners from the data set to be review. The system may be able to determine and disregard subscribers who will influence modelling negatively due to anomalous characteristics, for example: subscribers who are businesses.

At 415, the data may be prepared by the system by providing for feature extraction and feature engineering, by the feature extraction module 110. The system is configured to clean the data, as noted above. Once the data is cleaned, the feature extraction module 110 may determine and extract patterns from the data. The machine learning module 115 may then apply both business learning and machine learning to determine features based on the context of the data.

In some cases, temporal feature extraction may be determined. For example, QoE and user behavior metrics may be used with relation to time to extract meaning for each subscriber. In a specific example, the system may determine if service is degrading or improving over time. Other temporal features may also be determined. The system may further extract systemic features, for example, features that are generally constant across time. In some cases, these features may include for example, subscriber attributes, service plan, device type, geographic characteristics, and the like.

The system may further be configured to determine customer or subscriber features and perform subscriber feature extraction. Features may be extracted or derived by the system and may depend on the specifics of the network, the relationship between the subscriber QoE and systemic features, such as data plans, geography, device type, network characteristics and the like. While it may be desirable that the feature extraction by generic, on occasion, the feature extraction may be customized depending on the type of access network technology such as Fixed Access Networks, Mobile Access Networks, and the like.

Figures 7, 8:
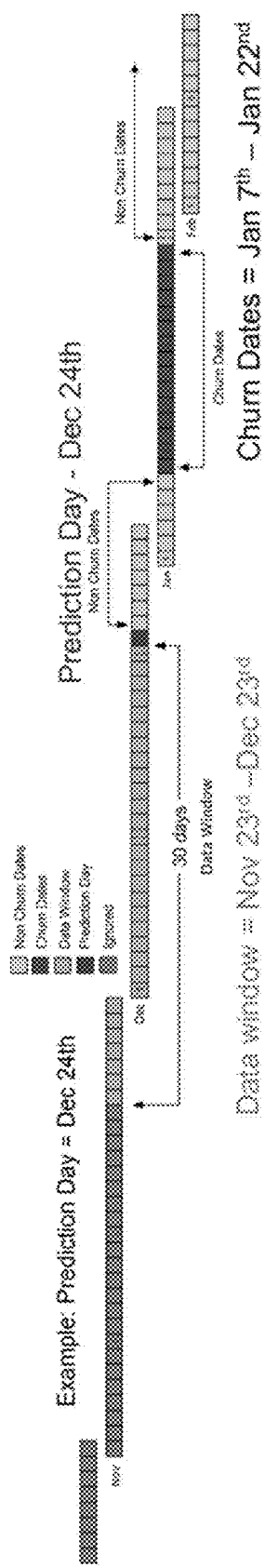
FIG. 7 illustrates the data preparation including a feature extraction method according to an embodiment.
FIG. 8 shows an example data set for data modeling.

After determining the features to be extracted, the system extracts these features. To extract features, a configurable number of consecutive days may be picked as the "data window". An Example of a data window is shown in FIG. 6. As an example, FIG. 7 shows the feature extraction process during data preparation. In this example, November 23rd to December 23rd is used to extract features. It will be understood that a different number of consecutive days may be picked, or the system may include a different granularity of data and may select a data window based on the granularity of data for the system. In further cases, data that may not be consecutive may be picked as the subscriber may have no data for a particular time period, or there may be extenuating circumstances as to why a particular data set may not be picked and/or may be considered an outlier.

Once the data is extracted, the system may train a model to be used to determine predictions of the subscribers for the operator. In some cases, the prediction may be determined by framing the problem to determine which type of data should be reviewed by the system. Once there is a determination of the type of data to be reviewed, the data may be generated to be fed to the system and machine learning module to be analyzed. The data may be analyzed to produce a result, for example a prediction. In order to continue to improve the machine learning module, the result may be reviewed for validity. Further, the machine learning module may continue to produce results based on new data sets that are analyzed by the machine learning module.

FIG. 7 illustrates a specific example of generating a data set. The prediction day is the day on which predictions are made, and in the example is shown to be December $24^{th}$. In this example, once the prediction day is selected the system may generate features using the previous 30 days, although other time frames may be selected. A subscriber is considered a churner if they churn in 15 to 30 days from prediction day, otherwise they are considered a non-churner.

In this example, for the model to predict an outcome on December 24th, the previous 30 days of data is examined from November 23rd to December 23rd. This will allow predictions to be made between 15 days into the future and up to 30 days. In this example, the method is configured to predict users who will churn from January 7th to January 24th.

FIG. 8 illustrates an example data set for data modeling. In this example, there are 3 churners (John, Jim, Jack) and 3 non-churners (Max, Mary, Mike) and the prediction day is set to December $24^{th}$.

Max did not churn. Mike and Mary are not considered churners because they did not churn within 15-30 days from December 24th. Therefore, for this example, they are labelled as non-churners.

In this example, the timeframe of 15 to 30 days is chosen to predict sufficiently into the future so the service provider and/or the system has time to implement some traffic actions to improve the subscriber's experience in order to reduce subscriber churn. The timeframe is intended to be far enough to provide for some beneficial traffic actions but short enough In order to predict churner's with reasonable accuracy. It is intended that the timeframe is configurable.

FIG. 9 illustrates the data inputs to the churn model for dates in the data window. If the data window is increased by a day from December $24^{th}$ to December $25^{th}$, most of the users in this specific example will continue to show up as "churned". There will be a few users who may now be too close to the prediction day, for example, 14 days from churning may be considered as non-churners as corrective traffic action may not reduce the likelihood that the user will churn. In addition, there may also be additional new churners. For example, in this example, the subscribers who were previously predicted to not churn until the 31st day now are on the 30th day and will be considered as churners.

Back to FIG. 5, the system may further train and evaluate the model, at 420. During the training of the machine learning module the outcomes are evaluated by the system. During training the model, the prediction outcomes are evaluated. In some cases, precision and recall are used to determine the value of the predictions, via the evaluation module 120. Precision is intended to measure how accurate the churn predictions are of the machine learning module. Recall is intended to measure the percent of churners the system was able to identify. While precision refers to the percentage of results that are relevant, recall refers to the percentage of total relevant results correctly classified by the model. Unfortunately, it may not be possible to maximize both these metrics at the same time as precision may come at a cost to recall. The system may determine whether to maximize precision or recall. For example, the system may be configured to set recall to 5% and determine the precision at 5% recall. The recall value may be configurable and may be selected at a number higher or lower than 5%. Lower recall may results in the model being very picky in deciding which subscribers may churn, but would not necessarily declare false positives.

As detailed herein, FIG. 3 illustrates a high-level method for reducing churn according to an embodiment. In some cases, a specific machine learning model may be selected for the machine learning module. In some cases, the machine learning model may be a Gaussian model, Light Gradient Boost Model, or the like as detailed herein. The system may also be preconfigured to instantiate the machine learning model with a set of parameters, for example, learning rate: 0.05, number of leaves: 32, minimum data in leaf: 100, and the like. In another example, the parameters may be set as follows: learning rate: 0.05, number of leaves: 16, minimum data in leaf: 50 and the like. In still another example, the system may be configured to set C (the penalty for large weights in a logistic regression model) to different values ranging from $10^{-4}$ to 0 to $10^4$. The system may also instantiate the machine learning model with a dataset which have been created as detailed herein.

Back to FIG. 5 at 425, the evaluation module is intended to review and analyze the training phase of the machine learning model and determine a final model that can be saved, loaded and used to predict on a new dataset. The evaluation model 120 is intended to validate the training output to determine the accuracy of the machine learning model.

In some cases, the evaluation module 120 may use N-Fold Cross Validation for a specific parameter set. The purpose of validation is to test model to see if the model may be able to work on new data sets, and find optimal hyperparameters. A model parameter is a configuration variable that is internal to the model and whose value is estimated from data during the training process. In contrast, a model hyperparameter is a configuration that is external to the model and whose value cannot be estimated from data. They are often used in processes to help estimate model parameters and are often specified upfront.

Figure 10:
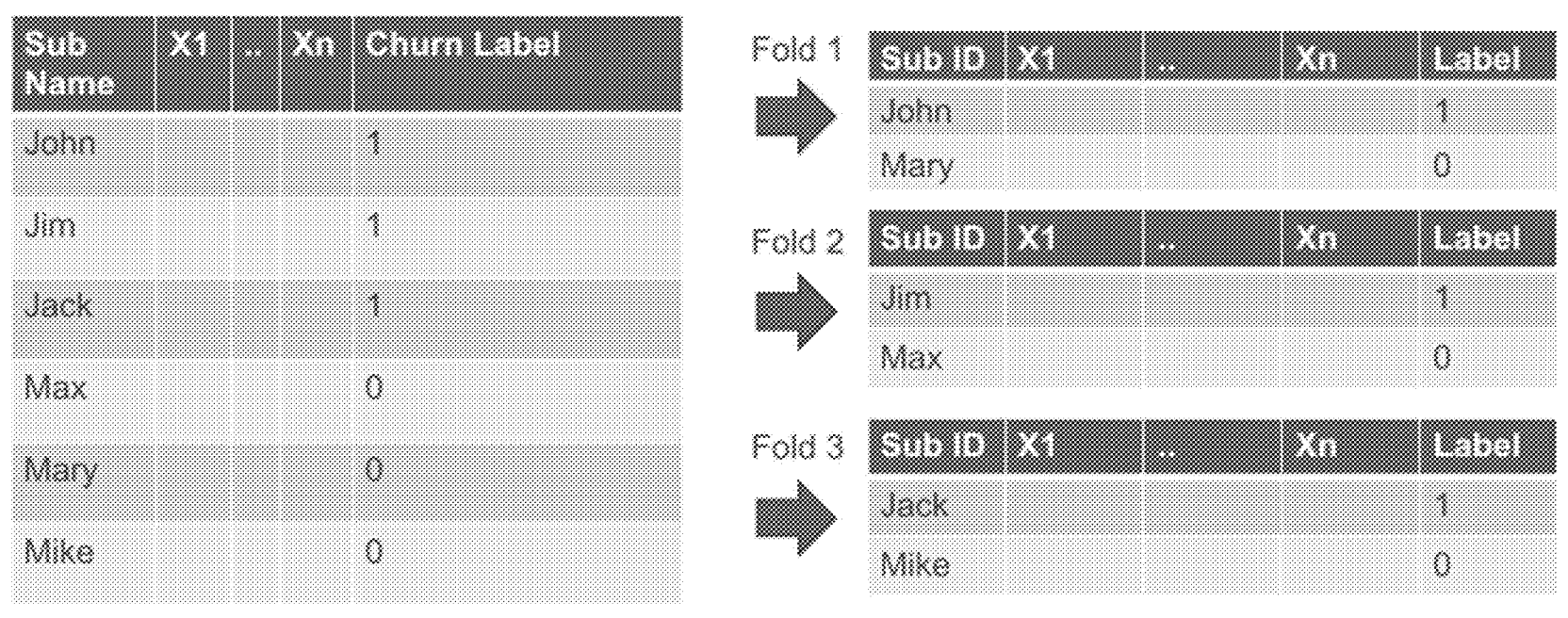

FIG. 10 illustrates an example of a 3-fold cross validation. It will be understood that the system may be configured to use an N-Fold Cross Validation (CV), which may depend on the subscribers and the data used by the service provider.

Figure 11:
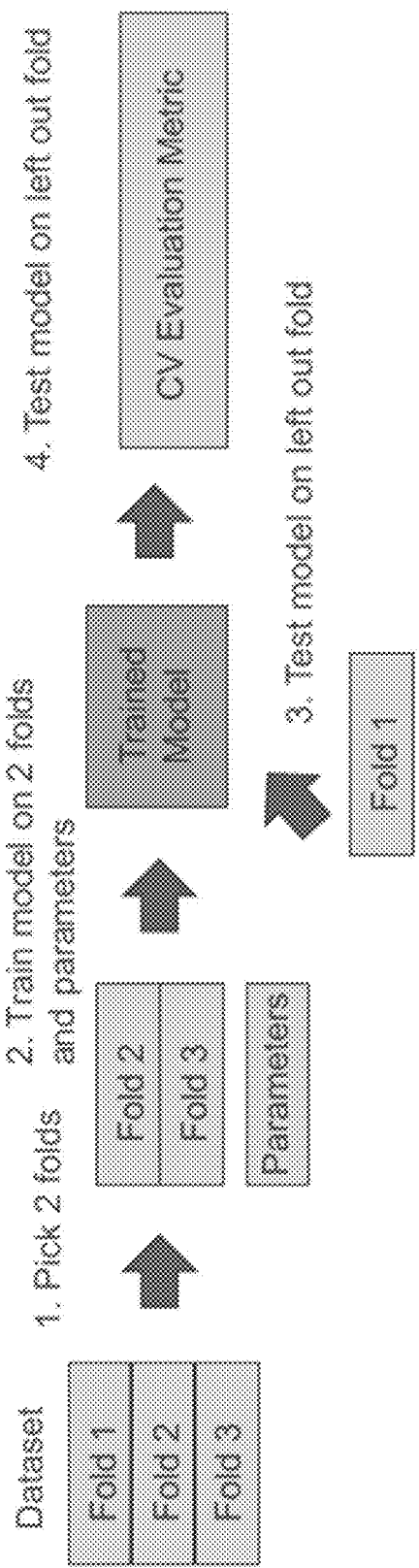
FIG. 11 illustrates a single iteration of 3-fold Cross Validation for the example data set.

In the example in FIG. 10, the data set is split into different groups. Each group is called a fold. The method for cross validation may include collecting a sample of the subscribers without replacement into N distinct equally sized groups (called folds). An evaluation metric is selected, at for example precision at 5% recall (although other metric may be used). A parameter set is also selected. The machine learning model of the machine learning module may be trained on N-1 folds presented at the same time. The output of the training is the machine learning model file. The machine learning module may now predict on the 1 fold left out (of the N-1 folds) and report the evaluation metric. This validation method may be repeated for all combinations of folds and each time a new evaluation metric is obtained. FIG. 11 illustrates an iteration of a 3-fold Cross Validation.

During the evaluation of the model, the evaluation module 120 may determine the mean of evaluation metrics to get N-fold cross validation evaluation metric for the model and parameter set, which may include, for example, learning rate, number of leaves, tree depth, minimum samples of leaf and the like. The outcome may be a metric (the mean of the evaluation metric) that indicates how the model performed for a specific parameter set, as shown at 430 in FIG. 5. This method may be repeated for a plurality of different parameter sets and data inputs to find a set that provides the service provider with a preferred and accurate output.

Using the specific example detailed above, FIG. 11 illustrates a 3-fold Cross Validation for all iterations. The data set is divided into 3 folds. The system selects 2 folds. The machine learning module is trained on the 2 folds and parameters. The evaluation module is configured to test the model on the remaining fold. This process is intended to be repeated for all combinations of folds as shown in FIG. 11.

Once all of the combinations of folds have been reviewed, a mean Cross Validation evaluation metric can be obtained.

Further, N-Fold Cross Validation may be further tuned, for example, by a scan across multiple sets of parameters. After the scan, the N-Fold Cross Validation process may be finished for one set of parameters. The mean Cross Validation evaluation metric is intended to provide for an idea as to how the model would fare with the parameters used. The outcome is intended to provide for an accurate model. A similar method may be repeated for other parameter sets to determine other models and select a preferred or optimal model. Once the model is ready, the machine learning module may use the model for data prediction.

To predict into the future for current subscribers, the prediction day is set to, for example, the current date, and the feature set is generated in a similar method to the method described in the training phase. The trained machine learning model is then given the dataset to predict whether the model predicts a subscriber will churn or not.

In some cases, this labeled data may not be available explicitly. In these cases, the labeled data may be derived by looking at the data records and looking for users who do not have any data after a certain time, for an extended period of time, for example between 30 to 60 days, although other time periods could be used. That is a likely indication that the user is not accessing the network and therefore has likely churned. The system may therefore assume that these previous subscribers have churned.

In other examples, other types of Classification techniques may be used, for example: Stochastic Vector Machines, Gaussian Naïve Bayes, and Logistic Regressions. Neural Network techniques considered include Deep Neural Networks and Recurrent Neural Networks. Other techniques may also be used.

These techniques have been compared in conventional solutions that have not been directed to user churn. In reviewing the techniques in unrelated areas, it has been shown that Gaussian Naïve Bayes is an intuitive approach and is accurate if variables are independent, Support Vector Machines, Logistic Regression can be more precise when variables are dependent. For larger data sets, with unknown input dependencies, Neural Networks may be the most appropriate technique. Recurrent Neural Networks enables time series prediction and thus allows time dependencies to be included for each feature and/or metric. Various specific examples are detailed herein.

There are various Machine Learning models that may help predict whether a subscriber will churn or not. Embodiments of the system and method detailed herein are intended to use these methods to predict and mitigate churn. In one particular example, the classification of Stochastic Vector Machines (SVM) may be used. In this case, the classification may determine the best hyperplane in n-dimensions. SVMs are linear classifiers that find a hyperplane to separate two classes of data In this example, it may be assumed that there is a set of training examples, called labeled data, $\{(x_1, y_1),$ $(x_2, y_2), \ldots, (x_r, y_r)\}$, where $xi=(x_1, x_2, \ldots, x_n)$ is an input vector and $y_i$ is its class label (output value), $y_i \in \{0, 1\}$ defined as 0: user did not churn and 1: user churned.

The system is configured to use SVM to a linear function (w: weight vector, b: constant):

$$f(x) = \langle w \cdot x \rangle + b$$

In this example, the hyperplane that separates users that churn and those who dot product $\langle w \cdot x \rangle + b = 0$ if $\langle w \cdot x_i \rangle + b \geq 0 \; y=1$ if $\langle w \cdot x_i \rangle + b < 0 \; y=0$ In this specific example where there are only 2 features (X1, X2) in the feature set, wherein X1=# of visits to competitor websites X2=# Days spent with bad QoE as noted above.

Embodiments of the system and method detailed herein are intended to address the following: Given input attributes $(x_1, x_2, \ldots x_n)$ determine Y (whether a user will churn). For a new set of features X, for example, $X_1=4$, $X_2=2$), the system and method are configured to predict with a high degree of confidence if Y=0 (did not churn) or is Y=1 (churned).

It may be stated that: W0+(W1×X1)+(W2×X2)=0, wherein W0 is the intercept and W1, W2 determines the line slope. It will be understood that a similar example may be extended to the case where the feature set has multiple dimensions, and therefore the straight line now becomes the hyperplane. The kernel may define the distance measure between new data and the support vectors. In a Linear Kernel SVM, the support vector is a hyperplane as follows:

$$K(x, x_i) = \Sigma(x \times x_i)$$

In a Polynomial Kernel SVM: the Support Vector is a curved line in the input space defined as:

$$K(x, x_i) = 1 + \Sigma(x \times x_i)^d$$

A Radial Kernel SVM can create complex regions within the feature space, like closed polygons in a two-dimensional space, defined, for example, as follows:

$$K(x, x_i) = e^{-gamma \times \Sigma((x - xi)^2)}$$

The parameter gamma may be determined by the system through heuristics.

In some other cases, another Classification Technique may be used, for example: Gaussian Naive Bayes. In this case, the principle may be built on Bayes Theorem. The aim may be to select the best hypothesis (h) given data (d).

$$P(h|d) = P(d|h) * P(h) / P(d)$$

Naive Bayes may be extended to real-valued attributes, by assuming a Gaussian distribution. Probabilities of X may be calculated using the Gaussian Probability Density Function (PDF). Each 'X' represents a feature say $X_1$=# of times the user visited competitor website. For each of the variables, the system and method are configured to find mean and standard-deviation, and then use PDF definition to find P.

P(pdf(X1)|Y=0) is calculated from the data as follows.

$$= \frac{1}{\sqrt{2 \times PI} \times \text{standard\_deviation}} \times e^{-\left(\frac{(z - mean(x))^2}{2 * \text{standard\_deviation}^2}\right)}$$

Likewise, P(pdf(X1)|Y=1) is calculated from the data similarly as above.

Output_1=P(pdf(X1)|Y=1)*P(pdf(X2)|Y=1)
Output_2=P(pdf(X1)|Y=0)*P(pdf(X2)|Y=0)

When Output_1>a predetermined threshold, then the outcome is declared as Y=1 and when Output_2<the predetermined threshold, then the outcome is declared as Y=0. For higher prediction accuracy, each of the variables may ideally be independent of each other, or at most have weak correlation between each other.

In a further example, the classification technique of logistic regression in order to build the machine learning model. Logistic Regression is a very common method for binary classification problems. The logistic function (sigmoid function) takes any real-valued number and maps it into a value between 0 and 1, but never exactly at those limits. For example:

$$P(X) = 1 / (1 + e^{\wedge} - (B0 + B1 * X1 + B2 * X2 + B3 * X3 \ldots))$$

Logistic function P(X) is the probability that input vector (X) belongs to a class "Churned" or "not-Churned" where $X = \{X_1, X_2, X_3, \ldots X_n\}$. Coefficients B0, B1, B2, B3 may be predetermined or may be learnt by the system during training and initialization of the system.

If P(X)>0.5, then the hypothesis is that the user churned. If P(X)<0.5, then the hypothesis is that the user did not churn.

It may be difficult to tell which metric, feature or combination of metrics and features drive churn in any given network for a service provider. Hence, it may be difficult for the method and system to select the at least one metric and feature for the purposes of churn analysis, prior to learning which features are key or main features for the particular service provider. In such cases, Neural Networks may be used to predict churn.

Figure 12:
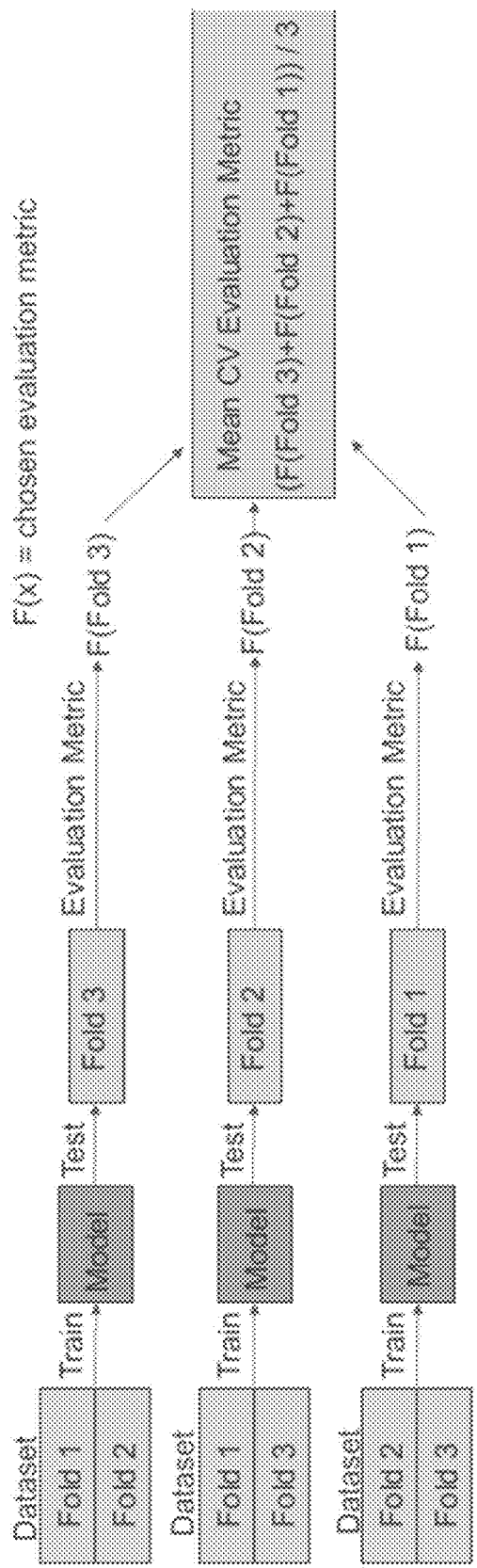
FIG. 12 illustrates a 3-fold Cross Validation for all iterations according to an embodiment.

In some cases, Neural Networks for Churn Reduction, may be used by the method or system. FIG. 12 illustrates a single layer neural network. A neural network may be trained by the system based on labeled data. The training may be done through standard Forward Propagation and Back Propagation techniques. Each Feature, for example, Input #i corresponds to an Xi. Input #1 is $X_1$, Input #2 is $X_2$, and the like.

Embodiments of the system and method may count the number of instances for that feature over the last predetermined time period, for example, 1 week, 1 month, 3 months, 6 months or the like. In a specific example, Xi=# of times the user went to a competitor website over the last 3 months.

The data is fed into the system, for example, $\{X_1, X_2, X_3, \ldots X_n\}$ and Labeled Data $\{Y=0, Y=1\}$ and the labeled data may train the Neural Network.

Figure 13:
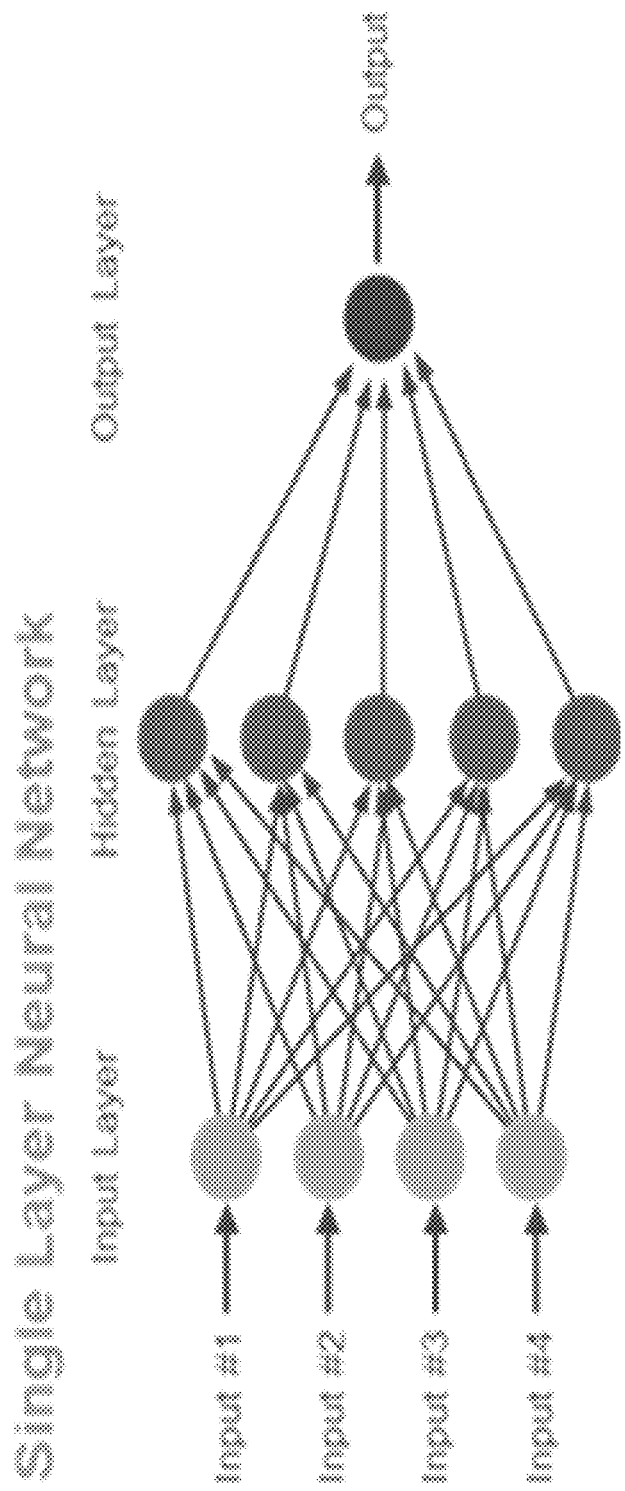
FIG. 13 illustrates an example of a single layer neural network.

In some cases, Deep Neural Network (DNN) may be used. A DNN may have many hidden layers and allow non-linear hypothesis to be expressed. With an increase in the number of layers, the system may help detect intricate dependencies in the data. A 2nd and a 3rd layer may help identify combinations of metrics and features which, when happening together have been shown to impact user churn. These features may be correlated. FIG. 13 illustrates a multi-layer neural network also referred to as a Deep Neural Network.

In some cases, there may be limitations of Deep Neural Network for Churn Prediction. DNN are not able to remember past correlations, and hence may not be able to provide an output based on past results Thus, in general, a DNN cannot encode time dependencies or contextual information. For example, a DNN may not be able to determine if a person visits a competitor website consistently for all days in a week, whether that is a greater indicator of churn compared than a person who visits 3-4 times per month the last 6 months.

In some other cases, Recurrent Neural Networks (RNN) may be used by the method and system. Recurrent Neural Network enables features to be tracked over time. An example Recurrent Neural Network is shown in FIG. 8. In a traditional Deep Neural Network (DNN): each neuron stores a single scalar value and each layer is a vector. In a Recurrent Neural Network (RNN): each neuron (inputs, hidden(s), and outputs) contains a vector of information. An entire DNN layer is encapsulated into one neuron in the RNN. All operations in RNNs, like mapping from one neuron's state to another, are intended to be over entire vectors, compared to individual scalars that are summed up with DNNs. As such, The RNN is intended to provide greater information with respect to user churn than a DNN.

Figure 14:
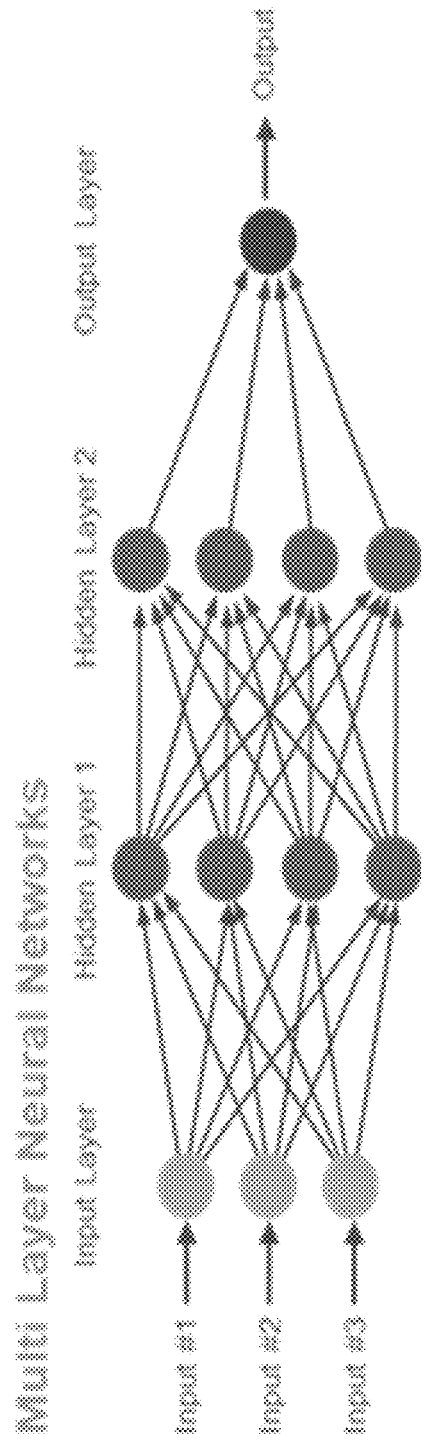
FIG. 14 illustrates an example of a multi-layer neural network.
Figure 15:
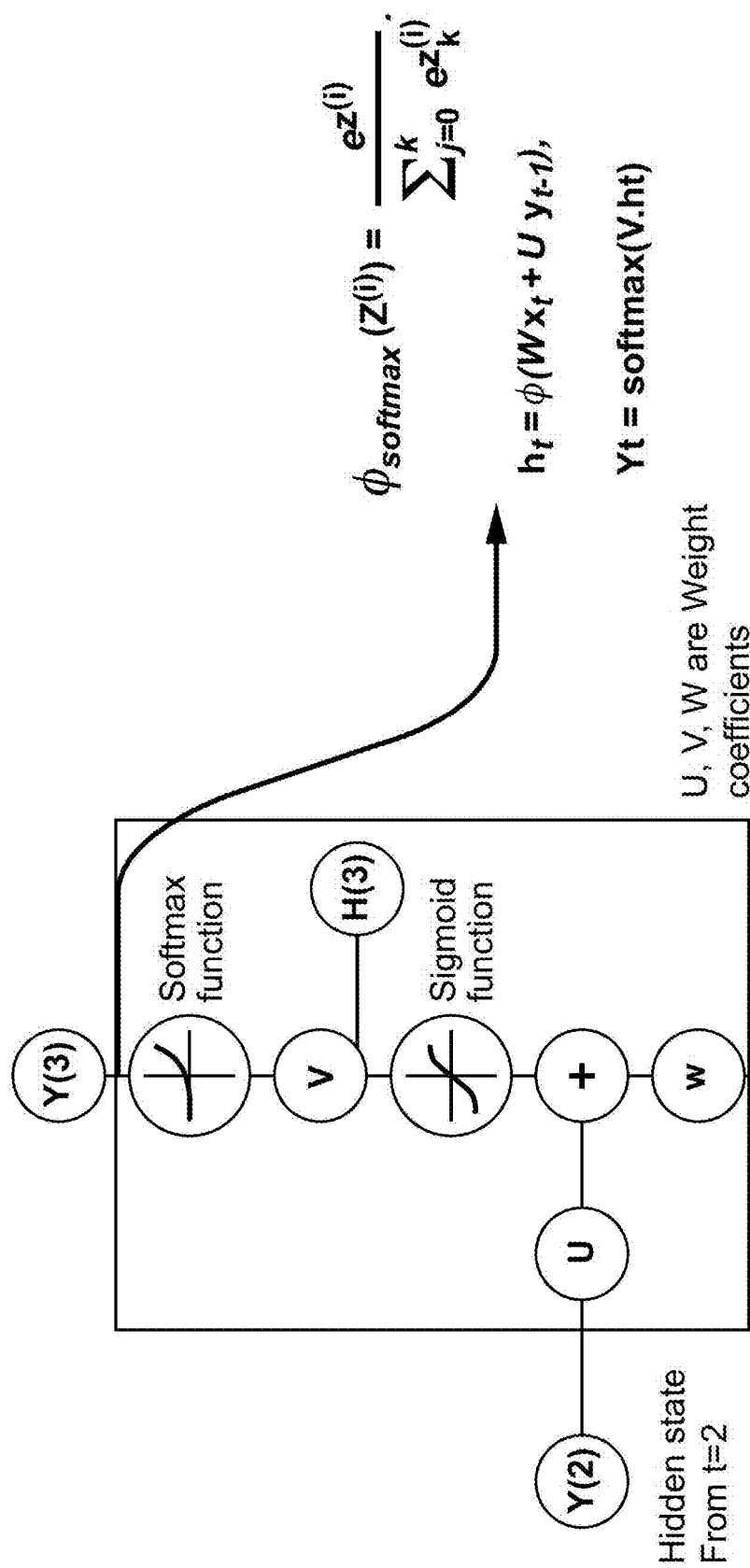
FIG. 15 illustrates an example of a recurrent neural network.

FIG. 14 shows the RNN at a given time slice say T=3. In some cases, the function may be shown as below.

$$h_t = \phi(Wf_t + Uh_{t-1}):$$

All of the fields may be vectors: Input f(3):f(3)=vector of features and/or metrics $\{X_1, X_2, X_3, \ldots X_n\}$ at time T=3, This may include hidden states H(2), H(3)=Internal states at times T=2, T=3. Output Y(3)=Outcome—did a user churn at time T=3?Y(3)=0 if the user is not likely to churn. Y(3)=1 if the user is likely to churn.

It will be understood that a decision reached at time t affects the decision the system and method will reach one moment later at time step t. The RNN is intended to replicate the single recurrent layer t times, once for each time step. Recurrent connections represent information flow based on stored data from the previous time step.

In a specific example, F(0) are values of features and/or metrics from 3 months back. F(1) are values of features and/or metrics from 2 months back, (F2) are values of the features and/or metrics from 1 month back. F(3) are values from current time. The system is configured to determine outcome y(t)=0 or 1, where y(t)=0: user did not churn at time t and y(t)=1 user churned at time t.

So Y(0) is the prediction of whether the user churned 3 months back. Y(1) is the prediction of whether the user churned 2 months back. Y(2) is the prediction of whether the user churned 1 month back. Y(3) is the prediction of whether the user churned now.

The method to predict churn using on RNN (that include time dependencies in data sets) is detailed herein. The system may collect labeled data over a predetermined time period, for example, the last 3 months.

The system may collect or retrieve the number of occurrences of $X_1$ in time period (T=1), number of occurrences of $X_1$ in time period (T=2), number of occurrences of $X_1$ in time period (T=3). The system is configured to collect the same information for other features, for example, $\{X_1, X_2, X_3, \ldots X_n\}$.

Given a labeled data set train the Recurrent Neural Network, embodiments of the system and method are configured to adjust the weights of the neurons appropriately through review of the historic data. Once the RNN is trained, it is then ready for new input streams X. The RNN model may then be used to predict if a user will churn or not (Y=0 or Y=1).

Embodiments of the system and method may indicate to the operator that a user is exhibiting the trends that will likely result in the subscriber leaving (and hence churn), e system and method are intended to determine the likely reasons (root cause) for this churn. Since this diagnostics is available to the operator well ahead of time, with a reasonably high degree of confidence, the operator may have time to take steps needed to prevent this particular user from churning. In other cases, the system itself may take mitigating actions. Reasons for churning may be varied depending on the subscriber—and the method of incipient churn prediction enables the operator to determine a course of action to take to give a specific user the best experience and incentives so that the user will not churn.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for creating a model for predicting and reducing subscriber churn in a computer network, the method comprising:

for a predetermined time period:
    retrieving traffic flow data per subscriber for a plurality of subscribers in the computer network;
    determining at least one subscriber metric per subscriber from the traffic flow data;
    determining whether the at least one subscriber metric includes data points to be condensed;
    determining at least one systemic feature associated with the plurality of subscribers, wherein the at least one systemic feature is based on an access network used by the computer network; and
    storing the at least one amalgamated metric and feature;
on reaching the predetermined time period create the model by:
    analyzing the at least one subscriber metric and the at least one systemic feature for the predetermined time period and determining a relationship between the at least one subscriber metric, the subscriber quality of experience and the at least one systemic feature;

predicting, per subscriber, whether the subscriber is going to churn within a churn period in the future based on the analysis;

validating the prediction by determining whether the subscriber actually churned during the churn period; and creating the model based on the validated predictions.

2. The method according to claim 1 wherein determining the at least one subscriber comprises:

determining if there are any missing data points for the at least one subscriber metric;

if there are any missing data points, determining whether a known value may be used in place of any of the missing data points and amalgamating the known value with the at least one subscriber metric;

otherwise determining whether there are sufficient data points for the at least one subscriber metric to make a prediction regarding subscriber churn.

3. The method according to claim I wherein determining the at least one subscriber metric comprises:

determining whether the at least one subscriber metric includes too many data points;

grouping the data points based on the time the data point was retrieved;

taking a mean of the grouped data points; and using the mean of the grouped data points as the at least one subscriber metric or the at least one systemic feature.

4. The method according to claim I wherein validating the prediction comprises:

determining the accuracy of the prediction per subscriber;

comparing a percent of all subscribers predicted to churn by the model to a percent of the subscribers that actually churn; and if the accuracy and the comparison are above a predetermined threshold, determine that the model is valid;

otherwise continue to prepare and develop the model.

5. The method according to claim 4 wherein the predetermined time period is sufficient in length to provide a sufficient data points for the prediction per subscriber.

6. The method according to claim 1 wherein the churn period comprises: a churn time period being a time period in the future, beyond when the prediction was made, which the model is making the prediction of whether the subscriber will churn.

7. The method according to claim 6 wherein the at least one metric per subscriber is selected based on the churn time period for the model.

8. The method according to claim 1 wherein the at least one systemic feature is selected from the group comprising: subscriber attributes; device attributes, subscriber service plan; location information; geographic information; and network information.

9. The method according to claim 1 wherein the validating the prediction comprises validating the prediction using N-fold cross validation.

10. The method according to claim 1 wherein the analyzing of the at least one metric and at least one feature uses a model selected from the group comprising: Gaussian model, Light Gradient Boost Model, Stochastic Vector Machines, Gaussian Naïvee ve Bayes, Logistic Regressions, Neural Network Deep Neural Networks and Recurrent Neural Networks.

11. A method for predicting and reducing subscriber churn on a computer network, the method comprising:

retrieving traffic flow data for a subscriber of the computer network;

determining at least one subscriber metric from the traffic flow data;

analyzing the at least one subscriber metric with a model for predicting subscriber churn;

determining whether the at least one subscriber metric includes data points to be condensed;

determining at least one systemic feature associated with the at least one subscriber, wherein the at least one systemic feature is based on an access network used by the computer network;

predicting whether the subscriber will churn during a predetermined churn period, based on the at least one subscriber metric and the at least one systemic feature and a relationship between the at least one subscriber metric, the subscriber quality of experience and the at least one systemic feature; and if the subscriber is predicted to churn, providing a traffic action on the traffic flow for the subscriber;

otherwise allowing the subscriber's traffic flow to continue without action.

12. The method for according to claim 11, wherein the churn period comprises: a churn time period being a time period in the future, past when the prediction was made, which the model is making the prediction of whether the subscriber will churn.

13. The method according to claim 11 wherein the traffic action is selected from a group comprising: shaping the traffic; providing the subscriber more bandwidth; reporting the subscriber to a service provider; and flagging the subscriber's traffic for further review.

14. A system for predicting and reducing subscriber churn on a computer network, the system comprising:

at least one processor connected to at least one memory storing instructions executable by the at least one processor to implement a plurality of modules comprising:

a data collection module configured to:
retrieve traffic flow data per subscriber for a plurality of subscribers in the computer network; and
determine at least one systemic feature associated with the plurality of subscribers, wherein the at least one systemic feature is based on an access network used by the computer network;

a feature extraction module configured to determine at least one metric per subscriber from the traffic flow data and determine whether the at least one subscriber metric includes data points to be condensed;

a machine learning module configured to:
analyze the at least one subscriber metric and the at least one systemic feature for the predetermined time period and determine a relationship between the at least one subscriber metric, the subscriber quality of experience and the at least one systemic feature;
create a model for predicting and reducing subscriber churn based on the analysis; and
predict per subscriber, whether the subscriber is going to churn within a churn period in the future based on the analysis;

an evaluation module configured to validate the prediction by determining whether the subscriber actually churned during the churn period; and a reporting module configured to perform a traffic action based on the prediction.

15. The system according to claim 14 wherein the data collection module is further configured to:
 determine if there are any missing data points for the at least one subscriber metric;
 if there are any missing data points, determine whether a known value may be used in place of any of the missing data points and amalgamate the known value with the at least one subscriber metric;
 otherwise determine whether there are sufficient data points for the at least one subscriber metric to make a prediction regarding subscriber churn.

16. The system according to claim 14 wherein the data collection module is further configured to:
 determine whether the at least one subscriber metric includes too many data points;
 group the data points based on the time the data point was retrieved;
 take a mean of the grouped data points; and
 use the mean of the grouped data points as the at least one subscriber metric or the at least one systemic feature.

17. The system according to claim 14 wherein the evaluation module is further configured to:
 determine the accuracy of the prediction per subscriber;
 compare a percent of all subscribers predicted to churn by the model to a percent of the subscribers that actually churn; and
 if the accuracy and the comparison are above a predetermined threshold, determine that the model is valid;
 otherwise continue to prepare and develop the model.

18. The system according to claim 14, wherein the traffic action is selected from a group comprising: shaping the traffic; providing the subscriber more bandwidth; reporting the subscriber to a service provider; and flagging the subscriber's traffic for further review.

19. The system according to claim 14 wherein the at least one systemic feature is selected from the group comprising: subscriber attributes; device attributes, subscriber service plan; location information; geographic information; and network information.

20. The system according to claim 14 wherein the predetermined time period is sufficient in length to provide a sufficient data points for the prediction per subscriber.

* * * * *